(12) United States Patent
Wang et al.

(10) Patent No.: US 8,795,818 B2
(45) Date of Patent: Aug. 5, 2014

(54) LIQUID TONER DIGITALLY PRINTABLE MEDIA

(75) Inventors: Yongzhong Wang, Tucson, AZ (US); Kelly Ronk, San Diego, CA (US); Hai Quang Tran, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 302 days.

(21) Appl. No.: 13/139,494

(22) PCT Filed: Dec. 16, 2008

(86) PCT No.: PCT/US2008/087054
§ 371 (c)(1),
(2), (4) Date: Jun. 13, 2011

(87) PCT Pub. No.: WO2010/071637
PCT Pub. Date: Jun. 24, 2010

(65) Prior Publication Data
US 2011/0244147 A1    Oct. 6, 2011

(51) Int. Cl.
*B32B 3/00*    (2006.01)
*B32B 5/16*    (2006.01)
*B32B 29/00*   (2006.01)
*B41M 5/52*    (2006.01)
*G03G 7/00*    (2006.01)
*B32B 27/32*   (2006.01)
*B32B 27/00*   (2006.01)
*B32B 27/08*   (2006.01)

(52) U.S. Cl.
CPC   *B41M 5/52* (2013.01); *B32B 27/32* (2013.01); *B32B 27/00* (2013.01); *B32B 27/08* (2013.01); *B41M 5/5218* (2013.01); *B41M 5/5236* (2013.01); *B41M 5/5245* (2013.01); *B41M 5/5254* (2013.01); *B41M 5/5272* (2013.01); *G03G 7/0013* (2013.01); *G03G 7/002* (2013.01); *G03G 7/0026* (2013.01); *G03G 7/0033* (2013.01); *G03G 7/004* (2013.01); *G03G 7/0046* (2013.01)

USPC ......... 428/206; 428/220; 428/325; 428/537.5

(58) Field of Classification Search
CPC ... B41M 5/5218; B41M 5/5254; B32B 27/08; B32B 27/32; B32B 29/00; C23C 30/005; G03G 7/0013; C04B 41/009; C04B 41/52; C08J 5/18
USPC .............................. 428/206, 220, 325, 537.5
See application file for complete search history.

(56) References Cited

U.S. PATENT DOCUMENTS 4,167,602 A    9/1979   Serlin
(Continued)

FOREIGN PATENT DOCUMENTS

EP    0199874 A1    11/1986
EP    0879917 A2    11/1998
(Continued)

OTHER PUBLICATIONS

Extended European Search Report (EESR) and European Search Opinion of the EPO mailed May 3, 2012 for counterpart PCT Application No. PCT/US2008/087054 (6 pages).

(Continued)

*Primary Examiner* — Betelhem Shewareged

(57) ABSTRACT

A liquid toner digitally printable media including: a paper substrate; and a toner receiving layer established on at least one surface of the paper substrate. The toner receiving layer includes: pigments, binders, and at least one of cationic polymers and metallic salts. The pigments are from 60 to 95% of total dry weight of the toner receiving layer. The pigments include a major pigment which is at least 60 weight percent of total pigment dry weight. The major pigment includes a rod-like pigment selected from the group consisting of ground calcium carbonate, precipitated calcium carbonate, other rod-like forms of calcium pigment, and combinations thereof.

15 Claims, 1 Drawing Sheet

(56) References Cited

U.S. PATENT DOCUMENTS

| | | | |
|---|---|---|---|
| 4,239,858 A | 12/1980 | Serlin | |
| 4,554,181 A | 11/1985 | Cousin et al. | |
| 5,007,964 A * | 4/1991 | Tsukisaka et al. | 106/464 |
| 5,437,925 A | 8/1995 | Macaulay et al. | |
| 5,858,555 A | 1/1999 | Kuroyama et al. | |
| 5,880,196 A | 3/1999 | Cho et al. | |
| 6,599,593 B1 | 7/2003 | Niu et al. | |
| 7,147,901 B2 | 12/2006 | Kasamatsu et al. | |
| 7,279,513 B2 | 10/2007 | Zhang et al. | |
| 2002/0148577 A1 | 10/2002 | Niu et al. | |
| 2003/0003277 A1* | 1/2003 | Morris et al. | 428/195 |
| 2004/0197496 A1 | 10/2004 | Song et al. | |
| 2006/0137574 A1* | 6/2006 | Preston et al. | 106/464 |
| 2006/0168811 A1 | 8/2006 | Ozawa et al. | |
| 2006/0198970 A1 | 9/2006 | Tamagawa | |
| 2007/0014941 A1 | 1/2007 | Chen et al. | |
| 2008/0075869 A1 | 3/2008 | Nelli | |
| 2008/0113126 A1 | 5/2008 | Anderson | |
| 2008/0173420 A1* | 7/2008 | Song et al. | 162/175 |

FOREIGN PATENT DOCUMENTS

| | | |
|---|---|---|
| EP | 1288013 A2 | 3/2003 |
| EP | 1947516 A1 | 7/2008 |
| JP | 57034561 A | 2/1982 |
| JP | 59174850 | 10/1984 |
| JP | 10020537 | 1/1998 |
| JP | 10-058823 A | 3/1998 |
| JP | 2008055696 A | 3/2008 |
| WO | 0060024 A1 | 10/2000 |
| WO | 2007055688 A1 | 5/2007 |

OTHER PUBLICATIONS

International Search Report (ISR) and Written Opinion of the International Searching Authority (ISA) mailed Aug. 31, 2009 from ISA/KR for counterpart PCT Application No. PCT/US2008/087054 (12 pages).

Jonen, B. P., "An Empirical Analysis of Paper Selection by Digital Printers," Master Thesis, Georgia Institute of Technology, Aug. 2007 (53 pages).

Bitla, S., "Application of Raman Techniques for Paper Coatings," Master Thesis, University of Maine, Aug. 2002 (79 pages).

Ott, M. et al., "Atomic Force Microscopy Adhesion Measurements of Surface-Modified Toners for Xerographic Appln," Physicochemical and Eng Aspects, 1994, pp. 245-256, vol. 87, 3.

Azadi, P. et al., "Discrete Elem Modeling of the Trans Heat Trans & Toner Fusing Process in the Xerographic Printing of Coated Papers," Comp & Chem Eng, 2008, pp. 3238-3245, vol. 32.

Gu, W., "Surface Modification of Pigments and its Role in Offset Ink Setting," Doctoral Thesis, The University of Maine, Dec. 2006 (152 pages).

State Intellectual Property Office of People's Republic of China (SIPO of PRC), Search Report (English translation) for counterpart patent application in China, 2 pages.

* cited by examiner

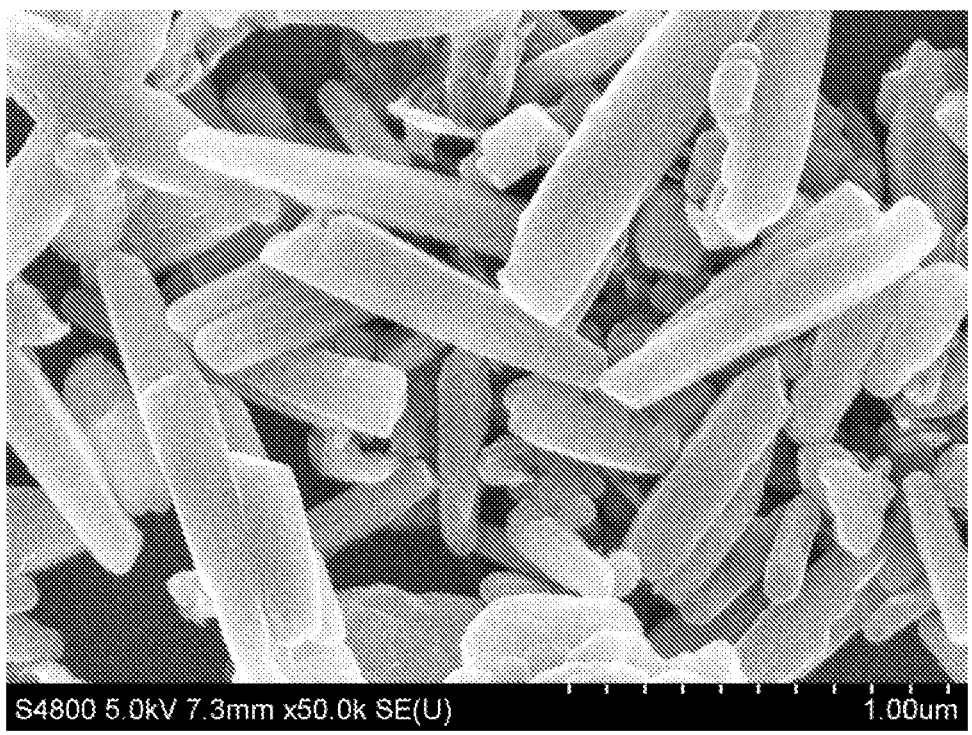

LIQUID TONER DIGITALLY PRINTABLE MEDIA

BACKGROUND

Most electrostatic printing apparatuses use dry toners for text and image printing. The quality and clarity of the text and image is related to the toner particle size. While very fine particle size can be achieved, environmental concerns limit the degree of minuteness that can be used in the toner particle size. In fixing the image, the dry toner particles are fused onto the printing media (e.g. paper) at relatively high temperature (e.g. in excess of about 100° C.). The high temperature of the fuser roll limits the printing speed and image quality of the printing apparatus. When the printing speed is increased, the dwelling time for the toner particles on the fuser roll is shortened. Short dwelling time of toner particles on the fuser roll (fast printing) often results in poor toner adhesion on the paper. To overcome this mentioned disadvantage, liquid toner has been developed for electrostatic printing.

In liquid toner, the toner particles are dispersed in a carrier liquid. Very fine toner particles can be used in the liquid toner without the same environmental concerns that arise with dry toner. Furthermore, high temperature is not needed to fuse the toner to paper. These advantages of liquid toner enable the printing apparatus to print high quality image at high speed. The Indigo® printing press from Hewlett-Packard applies liquid toner (Electroink®) technology to print high quality images. Paper is widely used as the image receiving media with the Indigo® press.

BRIEF DESCRIPTION OF THE DRAWINGS

Features and advantages of embodiments of the present disclosure will become apparent by reference to the following detailed description and drawings, in which:

FIG. 1 is an electron micrograph showing the shape and texture of an embodiment of the rod-like pigments of the instant disclosure.

DETAILED DESCRIPTION

One of the main objectives when paper is used in a liquid toner digital printing press is to achieve good toner adhesion to the paper. The paper and the liquid toner need to be attracted to and bond to each other to obtain good toner adhesion, otherwise they tend to have poor adhesion that results in flaking. Commercial papers, especially glossy coated papers, tend to have poor toner adhesion and to cause flaking of the toner layer when the printed papers are cut. It is, therefore, important that the liquid toner digitally printed paper can withstand various post-press operations such as die cut. Thus, there is a need for a paper which can be printed with liquid toner without the problems mentioned above.

The instant disclosure relates to liquid toner digitally printable media. Such media is imageable with a liquid toner digital printing press. Further, such media gives an excellent toner adhesion when the media is printed on a high speed liquid toner digital printing press. The media includes a paper substrate and a toner receiving layer on both sides of the paper substrate.

The paper substrate in the instant disclosure can be made of chemical pulp, mechanical pulp, and/or a combination of chemical and mechanical pulp. It is desirable to have the opacity of the paper be about 75% or over. In another embodiment, the opacity of the paper is greater than 85%. It is desirable for the brightness of the paper to be about 70 or over. In another embodiment, the brightness of the paper is greater than 80.

The paper substrate in the instant disclosure can have internal sizing and/or surface sizing. The internal sizing agents are not limited to any particular agents. They can be chosen from conventional internal sizing agents used for office papers. The surface sizing of the paper substrate is optional.

The paper substrate in the instant disclosure has a basis weight ranging from 38 to 200 $g/m^2$. The paper may have filler ranging from about 5% to about 30% by weight. The filler of the paper can be calcium carbonate, talc, clay, kaolin, titanium dioxide, and combinations thereof.

The paper substrate in the instant disclosure can have internal sizing and surface sizing. The internal sizing agents are not limited to any particular agents. They can be chosen from conventional internal sizing agents for papers. The surface sizing of the paper substrate is optional.

The toner receiving layer in the instant disclosure includes pigments, binders, cationic salts, and de-foaming agents. The total amount of pigment ranges from about 60% to about 95% by total dry weight of the toner receiving layer. In an embodiment, the total amount of pigments ranges from about 70% to about 85% by total dry weight of the toner receiving layer.

The pigments include one major pigment which is 60% or more of total pigment dry weight. In an embodiment, the major pigment is 80% or more of total pigment dry weight. In another embodiment, the major pigment has a rod- (or stick-) like shape with a median equivalent spherical diameter (ESD) of from about 0.1 microns to about 3 microns. In an embodiment, the ratio of rod length to rod diameter ranges from about 2 to about 20. The major pigment can be chosen from ground calcium carbonate, precipitated calcium carbonate, or other rod-like pigments.

Median ESD is an established unit for describing the size of an irregularly shaped particle obtained by measuring the diameter of a sphere of equivalent volume. The basis for using median ESD is described in Jennings, B. R. and Parslow, K. (1988) "Particle Size Measurement: The Equivalent Spherical Diameter", Proceedings of the Royal Society of London, Series A 419, pp. 137-149. In a non-limiting example, median ESD can be determined by a Microtrac-UPA150 laser light scattering device.

FIG. 1 is an electron micrograph showing the shape and texture of a group of major pigments, specifically the calcium carbonate, rod like particles with the median equivalent spherical diameter (ESD) and the ratio of rod length to rod diameter described above.

In an embodiment, the major pigment is precipitated calcium carbonate with a particle size in the range of 0.1 to 3 microns, measured in terms of ESD. The pigments may include a secondary pigment which is 40% or less of total pigment dry weight. In another embodiment, the secondary pigment is 20% or less of total pigment dry weight. The secondary pigments include but are not limited to clay, kaolin, talc, alumina, titanium dioxide, zeolites, organic pigments such as polyethylene, polymethyl methacrylate and Teflon® powders, and combinations thereof.

The pigments in the instant disclosure can also contain a small amount of high surface area pigment. The high surface area pigment can be chosen from fumed silica, precipitated silica, and synthetic silica. In an embodiment, the silica can have a surface area ranging from about 150 to about 300 square meters per gram ($m^2/g$). In another embodiment, fumed silica is used in the pigments for the toner receiving layer. The ratio of silica to calcium carbonate ranges from about 1% to about 10% by dry weight. In yet another embodiment, the ratio of silica to calcium carbonate ranges from about 1% to about 5% by dry weight.

The binder used in the instant disclosure has no particular restrictions as long as it is selected from water-based binders. Suitable water-based binders include polyvinyl alcohol; starch including oxidized starch, cationized starch, esterified starch, enzymatically denatured starch and so on; gelatin, casein, soybean protein, cellulose derivatives including carboxy-methyl cellulose, hydroxyethyl cellulose and the like, acrylic emulsion, vinyl acetate emulsion, vinylidene chloride emulsion, polyester emulsion, styrene-butadiene emulsion, acrylonitrile-butadiene latex, and polyvinylpyrrolidone.

In an embodiment, the binder can be chosen from water soluble binders. For example, polyvinyl alcohol can be chosen as the binder. The amount of the binder in the toner receptive coating can range from about 5% to about 25% by dry weight. In another embodiment, the amount of the binder in the toner receiving layer can range from about 8 to about 15% by dry weight of the toner receiving layer.

In the instant disclosure, the binder can be further cross-linked for enhanced coating strength. Suitable cross-linking agents include boric acid, borax (any of various salts of boric acid), aldehyde, glutaraldehyde, hydroxyadipaldehyde, melamine formaldehyde, zirconium ammonium carbonate, urea-formaldehyde, and polyamide-epichlorohydrin. In an embodiment, aldehyde is chosen as the cross-linking agent. The amount of cross-linking agent depends on the type of cross-linking agent chosen. The cross-linking agent ranges from about 2% to about 25% of dry weight of the binder in the toner receiving layer.

In the toner receiving layer of the instant disclosure, cationic polymer or metallic salt can be used for toner fixing and static control. Suitable cationic polymers include quaternary ammonium salt of derivatives of polyethyleneimines, polyamide epichlorohydrin, polyvinyl pyrrolidone, and cationic starch. In an embodiment, metallic salt is used in the toner receiving layer. The metallic salts include water-soluble mono or multi-valent metallic salts. These metallic salts may include cations of Group I metals, Group II metals, or Group III metals; or transitional metals, such as sodium ions, calcium ions, copper ions, nickel ions, magnesium ions, zinc ions, barium ions, iron ions, aluminum ions, and chromium ions. An anion species can be anions of: chloride, iodide, bromide, nitrate, sulfate, sulfite, phosphate, chlorate, acetate, or various combinations thereof. In another embodiment, a metallic salt is used in the toner receiving layer. In yet another embodiment, calcium chloride is chosen to be the metallic salt for use in the toner receptive coating.

In the toner receiving layer in the instant disclosure, coating additives, such as wetting agents, de-foaming agents, anti-foaming agents and dispersing agents may also be incorporated to improve the toner receptive coating properties and application of the coating onto the paper substrate by various coating methods.

The toner receiving layer may be coated onto the paper substrate using any method known in the art including size press, slot die, blade coating and Meyer rod. The size presses include puddle-sized press, film-sized press and the like. The puddle-size press may be configured to have horizontal, vertical, or inclined rollers. The film-size press may include a metering system, such as gate-roll metering, blade metering, Meyer rod metering, or slot metering. For some embodiments, a film-size press with short-dwell blade metering may be used as an application head to apply a coating solution. In an embodiment, a film-size press is used to apply the toner receptive coating to paper substrate. The toner receiving layer can be applied to paper substrate either off-line or in-line of a paper making machine. In another embodiment, the toner receiving layer is applied to the paper substrate by a size press on-line while the paper is being made on a paper machine.

The toner receiving layer can be applied to both sides of a paper substrate in a coating weight from 2 to 15 grams per square meter (gsm). In an embodiment, the coating weight ranges from 5 to 10 gsm.

In another embodiment, a calendaring process can be used after drying the toner receptive coating composition to improve surface smoothness and gloss. The calendaring process can include super calendar and soft calendar. In another embodiment, an on-line soft calendar can be used to achieve the appropriate smoothness and gloss target. The gloss is measured at 75 degrees for all examples and comparative examples below.

EXAMPLES

The instant disclosure is further illustrated by the following examples below using the described test methods. It is to be understood that these examples should not be construed as limiting the scope of embodiments of the present disclosure. The parts in the examples are all in weight parts, unless specified otherwise.

Example 1

Mowiol 6-98® (polyvinyl alcohol) solution, calcium chloride solution and Orisil 175® (fumed silica) slurry were combined together to make the final toner receptive coating slurry in Example 1.

Mowiol 6-98® solution (19%) was made as follows: 19.00 parts of Mowiol 6-98® powder was added to 81.00 parts of water at room temperature under agitation. The mixture was then heated up to 93 degrees and maintained at that temperature until Mowiol 6-98® was dissolved in the water. (Mowiol 6-98® is available from Clariant Corporation.)

Calcium chloride solution (40%) was made as follows: 40.00 parts of calcium chloride was added to 60.00 parts of water and the mixture was stirred until the calcium chloride powder was dissolved in the water. (Calcium chloride is available from Dow Chemicals, Inc.)

Orisil 175® slurry (12%) was prepared as follows: 12.00 parts of Orisil 175® was added to 88.00 parts of water under agitation to form a slurry. (Orisil 175® is available from Orisil LTD, Ukraine.)

A toner receiving layer slurry was prepared as follows: 38.00 parts of Mowiol 6-98® solution, 12.48 parts of water, 0.12 parts of Foamaster VF® (a petroleum derivative defoamer) were added to the container under agitation. 40.50 parts of Opacarb A40® (precipitated calcium carbonate) was added to the container and mixed. 4.80 parts of calcium chloride solution was added to the container and mixed. 4.10 parts of Orisil 175® slurry was added to the container and mixed. The mixture was mixed under high shear to form the toner receptive coating slurry of Example 1. This toner receptive coating slurry was coated on both sides of 40 pounds (lb) Accent Opaque Smooth® paper from International Paper Company (IP40®) by a size press. The coating was dried and calendared by an in-line soft-calendar to achieve 30.5% gloss. (Foamaster VF® is available from Cognis Corporation. Opacarb A40® is available from Minerals Technologies Inc.)

Example 2

Mowiol 15-79® (polyvinyl alcohol) solution (14%) was made as follows: 14.00 parts of Mowiol 15-79® powder was added to 86.00 parts of water at room temperature under agitation. The mixture was then heated up to 93 degree and maintained at that temperature until Mowiol 15-79® was dissolved to form the solution. (Mowiol 15-79® is available from Clariant Corporation.)

A toner receptive coating was prepared as follows: In the toner receptive coating slurry, 34.86 parts of Mowiol 6-98® solution, 12.20 parts of Mowiol 15-79® solution and 8.62 parts of water by weight were added to a container and mixed. 39.60 parts of Opacarb A40® was added to the container and mixed. 4.80 parts of calcium chloride solution was added to the container and mixed. 0.12 parts of Foamaster VF® was added to the container and mixed. The toner receptive coating slurry was coated on both sides of IP40® paper with a size press. The coating was dried and calendared by an in-line soft-calendar to achieve 30.7% gloss. The dry coating weight was around 7 gsm per side.

Comparative Example 1

A lightweight coated paper was used as Comparative Example 1. The base paper (IP40® paper) was coated with a toner receptive coating developed by Hewlett-Packard Company. The toner receptive coating contained kaolin clay, calcium chloride, polyvinyl alcohol and styrene butadiene copolymer binder, but no precipitated calcium carbonate (Opacarb A40®). The toner receptive coating slurry was coated on both sides of IP40® paper with a size press. The coating was dried and calendared by an in-line soft-calendar to have 30.7% gloss. The dry coating weight was around 7 gsm per side.

Test Results
Toner Adhesion

The samples were printed with three black-colored stripes: true black (100% liquid toner), composite black (300% liquid toner), and true black/composite black combination (400% liquid toner). A piece of Scotch® adhesive tape was applied across the printed stripe and then removed from the printed surface. The amount of liquid toner removed by the Scotch® adhesive tape is an indication of toner adhesion to the paper substrate. The toner adhesion is rated from 1 to 5, with 5 being the least amount of liquid toner removal and 1 being the most amount of liquid toner removal from the printed samples.

Edge Cut Quality

The samples were printed with black-colored stripes. The samples were then cut across the stripe to see if any liquid toner is chipped away from the cutting edge. The edge cut quality of the prints is rated from 1 to 5 with 5 being the least amount and 1 being the most amount of liquid toner chipped away from the cutting edge.

The test results for Toner Adhesion and Edge Cut Quality as described above are shown in the table below for samples using Example 1, Example 2 and Comparative Example 1 toner receiving layers, respectively.

TABLE

Test Results

|  | Toner Adhesion | Edge Cut Quality |
|---|---|---|
| Example 1 | 5 | 5 |
| Example 2 | 3 | 3 |
| Comparative Example 1 | 1 | 1 |

According to the test results shown above in the Table, Example 1 and Example 2 had much better toner adhesion and edge cut quality than Comparative Example 1.

Clause 1. A method of making a liquid toner digitally printable media, comprising the steps of:
(a) applying a toner receiving layer to at least one side of a paper substrate at a coating weight of from 2 to 15 grams per square meter;
(b) drying the toner receiving layer;
wherein the toner receiving layer includes:
pigments;
binders; and
at least one of cationic polymers and metallic salts;
wherein the pigments are from 60 to 95% of total dry weight of the toner receiving layer;
and wherein the pigments include a major pigment, the major pigment being at least 60 weight percent of total pigment dry weight, the major pigment including a rod-like pigment with a median equivalent spherical diameter (ESD) of from 0.1 microns to 3 microns and with a ratio of rod length to rod diameter ranging from 2 to 20.

Clause 2. The method of clause 1 wherein the major pigment is selected from the group consisting of ground calcium carbonate, precipitated calcium carbonate, other rod-like forms of calcium pigment, and combinations thereof.

Clause 3. The method of any the preceding clauses wherein the pigments further include a secondary pigment, the secondary pigment being at most 40 weight percent of total pigment dry weight, the secondary pigment is selected from the group consisting of clay, kaolin, talc, alumina, titanium dioxide, zeolites, organic pigments, and combinations thereof.

Clause 4. The method of any of the preceding clauses wherein the pigments further include a high surface area pigment having a surface area from 150 to 300 square meters per gram, the high surface area pigment being present at a ratio to calcium carbonate in the print media of from 1% to 10%.

Clause 5. The method of any of the preceding clauses wherein the binder includes a water-based binder selected from the group consisting of polyvinyl alcohol, oxidized starch, cationized starch, esterified starch, enzymatically denatured starch, gelatin, casein, soybean protein, carboxymethyl cellulose, hydroxyethyl cellulose, acrylic emulsion, vinyl acetate emulsion, vinylidene chloride emulsion, polyester emulsion, styrene-butadiene emulsion, acrylonitrile-butadiene latex, polyvinylpyrrolidone and combinations thereof;
wherein the cationic polymers are selected from the group consisting of quaternary ammonium salt derivatives of polyethyleneimines, polyamide, epichlorohydrin, polyvinyl pyrrolidone, cationic starch and combinations thereof; and
wherein the metallic salts are selected from the group consisting of monovalent metallic salts and multivalent metallic salts, with the cations of the metallic salts being selected from the group consisting of sodium, calcium, copper, nickel, magnesium, zinc, barium iron, aluminum, chromium ions and combinations thereof; and with the anions of the metallic salts being selected from the group consisting of chloride, iodide, bromide, nitrate, sulfate, sulfite, phosphate, chlorate, acetate ions and combinations thereof;
and wherein the print media further includes at least one of wetting agents, de-foaming agents, anti-foaming agents and dispersing agents.

Clause 6. The method of any of the preceding clauses, further comprising: calendaring the dried toner receiving layer.

Clause 7. A system for making a liquid toner digitally printable media, comprising:
(a) a paper substrate;
(b) a substrate coating device for applying the toner receiving layer on at least one side of the paper substrate, the substrate coating device being selected from the group consisting of a size press, a slot die, a blade coating and a Meyer rod;
   wherein the toner receiving layer includes:
   pigments;
   binders; and
   at least one of cationic polymers and metallic salts;
   wherein the pigments are from 60 to 95% of total dry weight of the toner receiving layer;
   and wherein the pigments include a major pigment, the major pigment being at least 60 weight percent of total pigment dry weight, the major pigment including a rod-like pigment with a median equivalent spherical diameter (ESD) of from 0.1 microns to 3 microns and with a ratio of rod length to rod diameter ranging from 2 to 20.

Clause 8. The system of clause 7, wherein the major pigment is selected from the group consisting of ground calcium carbonate, precipitated calcium carbonate, other rod-like forms of calcium pigment, and combinations thereof.

Clause 9. The system of any of clauses 7 and 8 wherein the pigments further include a secondary pigment, the secondary pigment being at most 40 weight percent of total pigment dry weight, the secondary pigment is selected from the group consisting of clay, kaolin, talc, alumina, titanium dioxide, zeolites, organic pigments, and combinations thereof;
   and wherein the pigments further include a high surface area pigment having a surface area from 150 to 300 square meters per gram, the high surface area pigment being present at a ratio to calcium carbonate in the print media of from 1% to 10%.

Clause 10. The system of any of clauses 7 through 9 wherein the binder includes a water-based binder selected from the group consisting of polyvinyl alcohol, oxidized starch, cationized starch, esterified starch, enzymatically denatured starch, gelatin, casein, soybean protein, carboxymethyl cellulose, hydroxyethyl cellulose, acrylic emulsion, vinyl acetate emulsion, vinylidene chloride emulsion, polyester emulsion, styrene-butadiene emulsion, acrylonitrile-butadiene latex, polyvinylpyrrolidone and combinations thereof;
   wherein the cationic polymers are selected from the group consisting of quaternary ammonium salt derivatives of polyethyleneimines, polyamide, epichlorohydrin, polyvinyl pyrrolidone, cationic starch and combinations thereof; and
   wherein the metallic salts are selected from the group consisting of monovalent metallic salts and multivalent metallic salts, with the cations of the metallic salts being selected from the group consisting of sodium, calcium, copper, nickel, magnesium, zinc, barium iron, aluminum, chromium ions and combinations thereof; and with the anions of the metallic salts being selected from the group consisting of chloride, iodide, bromide, nitrate, sulfate, sulfite, phosphate, chlorate, acetate ions and combinations thereof;
   and wherein the print media further includes at least one of wetting agents, de-foaming agents, anti-foaming agents and dispersing agents.

Clause 11. Liquid toner digitally printable media, comprising:
   a paper substrate; and
   a toner receiving layer established on at least one surface of the paper substrate, the toner receiving layer including:
   pigments;
   binders; and
   at least one of cationic polymers and metallic salts;
   wherein the pigments are from 60 to 95% of total dry weight of the toner receiving layer;
   and wherein the pigments include a major pigment, the major pigment being at least 60 weight percent of total pigment dry weight, the major pigment including a rod-like pigment with a median equivalent spherical diameter (ESD) of from 0.1 microns to 3 microns and with a ratio of rod length to rod diameter ranging from 2 to 20.

Clause 12. The printable media of any of the preceding clauses wherein the major pigment is selected from the group consisting of ground calcium carbonate, precipitated calcium carbonate, other rod-like pigments, and combinations thereof.

Clause 13. The printable media of any of the preceding clauses wherein the pigments further include a secondary pigment, the secondary pigment being at most 40 weight percent of total pigment dry weight, the secondary pigment is selected from the group consisting of clay, kaolin, talc, alumina, titanium dioxide, zeolites, organic pigments, and combinations thereof.

Clause 14. The printable media of any of the preceding clauses wherein the pigments further include a high surface area pigment having a surface area from 150 to 300 square meters per gram, the high surface area pigment being present at a ratio to calcium carbonate in the print media of from 1% to 10%.

Clause 15. The printable media of any of the preceding clauses wherein the binder includes a water-based binder selected from the group consisting of polyvinyl alcohol, oxidized starch, cationized starch, esterified starch, enzymatically denatured starch, gelatin, casein, soybean protein, carboxy-methyl cellulose, hydroxyethyl cellulose, acrylic emulsion, vinyl acetate emulsion, vinylidene chloride emulsion, polyester emulsion, styrene-butadiene emulsion, acrylonitrile-butadiene latex, polyvinylpyrrolidone and combinations thereof;
   wherein the cationic polymers are selected from the group consisting of quaternary ammonium salt derivatives of polyethyleneimines, polyamide, epichlorohydrin, polyvinyl pyrrolidone, cationic starch and combinations thereof;
   wherein the metallic salts are selected from the group consisting of monovalent metallic salts and multivalent metallic salts, with the cations of the metallic salts being selected from the group consisting of sodium, calcium, copper, nickel, magnesium, zinc, barium iron, aluminum, chromium ions and combinations thereof; and with the anions of the metallic salts being selected from the group consisting of chloride, iodide, bromide, nitrate, sulfate, sulfite, phosphate, chlorate, acetate ions and combinations thereof;
   and wherein the print media further includes at least one of wetting agents, de-foaming agents, anti-foaming agents and dispersing agents.

While several embodiments have been described in detail, it will be apparent to those skilled in the art that the disclosed embodiments may be modified. Therefore, the foregoing description is to be considered exemplary rather than limiting.

What is claimed is:

1. Liquid toner digitally printable media, comprising:
   a paper substrate; and
   a toner receiving layer established on at least one surface of the paper substrate, the toner receiving layer including:
   pigments;
   binders; and
   at least one of cationic polymers and metallic salts;
   wherein the pigments are from 60 to 95% of total dry weight of the toner receiving layer;
   and wherein the pigments include a major pigment, the major pigment being at least 60 weight percent of total pigment dry weight, the major pigment including a rod-like pigment with a median equivalent spherical diameter (ESD) of from 0.1 microns to 3 microns and with a ratio of rod length to rod diameter ranging from 2 to 20.

2. The printable media according to claim 1 wherein the major pigment is selected from the group consisting of ground calcium carbonate, precipitated calcium carbonate, other rod-like pigments, and combinations thereof.

3. The printable media according to claim 1 wherein the pigments further include a secondary pigment, the secondary pigment being at most 40 weight percent of total pigment dry weight, the secondary pigment being selected from the group consisting of clay, kaolin, talc, alumina, titanium dioxide, zeolites, organic pigments, and combinations thereof.

4. The printable media according to claim 1 wherein the pigments further include a high surface area pigment having a surface area from 150 to 300 square meters per gram, the high surface area pigment being present at a ratio to calcium carbonate in the print media of from 1% to 10%.

5. The printable media according to claim 1 wherein the binder includes a water-based binder selected from the group consisting of polyvinyl alcohol, oxidized starch, cationized starch, esterified starch, enzymatically denatured starch, gelatin, casein, soybean protein, carboxy-methyl cellulose, hydroxyethyl cellulose, acrylic emulsion, vinyl acetate emulsion, vinylidene chloride emulsion, polyester emulsion, styrene-butadiene emulsion, acrylonitrile-butadiene latex, polyvinylpyrrolidone, and combinations thereof;
wherein the cationic polymers are selected from the group consisting of quaternary ammonium salt derivatives of polyethyleneimines, polyamide, epichlorohydrin, polyvinyl pyrrolidone, cationic starch, and combinations thereof; and wherein the metallic salts are selected from the group consisting of monovalent metallic salts and multivalent metallic salts, with the cations of the metallic salts being selected from the group consisting of sodium, calcium, copper, nickel, magnesium, zinc, barium iron, aluminum, chromium ions, and combinations thereof; and with the anions of the metallic salts being selected from the group consisting of chloride, iodide, bromide, nitrate, sulfate, sulfite, phosphate, chlorate, acetate ions and combinations thereof;
and wherein the print media further includes at least one of wetting agents, de-foaming agents, anti-foaming agents, and dispersing agents.

6. A method of making a liquid toner digitally printable media, the method comprising:
applying a toner receiving layer to at least one side of a paper substrate at a coating weight of from 2 to 15 grams per square meter; and
drying the toner receiving layer;
wherein the toner receiving layer includes:
pigments;
binders; and
at least one of cationic polymers and metallic salts;
wherein the pigments are from 60 to 95% of total dry weight of the toner receiving layer;
and wherein the pigments include a major pigment, the major pigment being at least 60 weight percent of total pigment dry weight, the major pigment including a rod-like pigment with a median equivalent spherical diameter (ESD) of from 0.1 microns to 3 microns and with a ratio of rod length to rod diameter ranging from 2 to 20.

7. The method according to claim 6 wherein the major pigment is selected from the group consisting of ground calcium carbonate, precipitated calcium carbonate, other rod-like forms of calcium pigment, and combinations thereof.

8. The method according to claim 6 wherein the pigments further include a secondary pigment, the secondary pigment being at most 40 weight percent of total pigment dry weight, the secondary pigment is selected from the group consisting of clay, kaolin, talc, alumina, titanium dioxide, zeolites, organic pigments, and combinations thereof.

9. The method according to claim 6 wherein the pigments further include a high surface area pigment having a surface area from 150 to 300 square meters per gram, the high surface area pigment being present at a ratio to calcium carbonate in the print media of from 1% to 10%.

10. The method according to claim 6 wherein the binder includes a water-based binder selected from the group consisting of polyvinyl alcohol, oxidized starch, cationized starch, esterified starch, enzymatically denatured starch, gelatin, casein, soybean protein, carboxy-methyl cellulose, hydroxyethyl cellulose, acrylic emulsion, vinyl acetate emulsion, vinylidene chloride emulsion, polyester emulsion, styrene-butadiene emulsion, acrylonitrile-butadiene latex, polyvinylpyrrolidone, and combinations thereof;
wherein the cationic polymers are selected from the group consisting of quaternary ammonium salt derivatives of polyethyleneimines, polyamide, epichlorohydrin, polyvinyl pyrrolidone, cationic starch and combinations thereof; and wherein the metallic salts are selected from the group consisting of monovalent metallic salts and multivalent metallic salts, with the cations of the metallic salts being selected from the group consisting of sodium, calcium, copper, nickel, magnesium, zinc, barium iron, aluminum, chromium ions and combinations thereof; and with the anions of the metallic salts being selected from the group consisting of chloride, iodide, bromide, nitrate, sulfate, sulfite, phosphate, chlorate, acetate ions and combinations thereof;
and wherein the print media further includes at least one of wetting agents, de-foaming agents, anti-foaming agents, and dispersing agents.

11. The method according to claim 6, further comprising calendaring the dried toner receiving layer.

12. A system for making a liquid toner digitally printable media, comprising:
a paper substrate; and
a substrate coating device for applying a toner receiving layer on at least one side of the paper substrate, the substrate coating device being selected from the group consisting of a size press, a slot die, a blade coating and a Meyer rod;
wherein the toner receiving layer includes:
pigments;
binders; and
at least one of cationic polymers and metallic salts;
wherein the pigments are from 60 to 95% of total dry weight of the toner receiving layer;
and wherein the pigments include a major pigment, the major pigment being at least 60 weight percent of total pigment dry weight, the major pigment including a rod-like pigment with a median equivalent spherical diameter (ESD) of from 0.1 microns to 3 microns and with a ratio of rod length to rod diameter ranging from 2 to 20.

13. The system according to claim 12 wherein the major pigment is selected from the group consisting of ground calcium carbonate, precipitated calcium carbonate, other rod-like forms of calcium pigment, and combinations thereof.

14. The system according to claim 12 wherein the pigments further include a secondary pigment, the secondary pigment being at most 40 weight percent of total pigment dry weight, the secondary pigment being selected from the group consisting of clay, kaolin, talc, alumina, titanium dioxide, zeolites, organic pigments, and combinations thereof;

and wherein the pigments further include a high surface area pigment having a surface area from 150 to 300 square meters per gram, the high surface area pigment being present at a ratio to calcium carbonate in the print media of from 1% to 10%.

15. The system according to claim 12 wherein the binder includes a water-based binder selected from the group consisting of polyvinyl alcohol, oxidized starch, cationized starch, esterified starch, enzymatically denatured starch, gelatin, casein, soybean protein, carboxy-methyl cellulose, hydroxyethyl cellulose, acrylic emulsion, vinyl acetate emulsion, vinylidene chloride emulsion, polyester emulsion, styrene-butadiene emulsion, acrylonitrile-butadiene latex, polyvinylpyrrolidone, and combinations thereof;

wherein the cationic polymers are selected from the group consisting of quaternary ammonium salt derivatives of polyethyleneimines, polyamide, epichlorohydrin, polyvinyl pyrrolidone, cationic starch and combinations thereof; and wherein the metallic salts are selected from the group consisting of monovalent metallic salts and multivalent metallic salts, with the cations of the metallic salts being selected from the group consisting of sodium, calcium, copper, nickel, magnesium, zinc, barium iron, aluminum, chromium ions and combinations thereof; and with the anions of the metallic salts being selected from the group consisting of chloride, iodide, bromide, nitrate, sulfate, sulfite, phosphate, chlorate, acetate ions and combinations thereof;

and wherein the print media further includes at least one of wetting agents, de-foaming agents, anti-foaming agents and dispersing agents.

* * * * *